United States Patent [19]
Genovese

[11] 4,091,313
[45] May 23, 1978

[54] CURRENT RECYCLING ELECTRIC MOTOR SYSTEM

[76] Inventor: Salvatore Genovese, 3744 Gunderson Ave., Berwyn, Ill. 60402

[21] Appl. No.: 716,382

[22] Filed: Aug. 23, 1976

[51] Int. Cl.$^2$ .......................................... H02K 13/00
[52] U.S. Cl. .................................. 318/439; 318/495; 318/498
[58] Field of Search ............... 318/439, 495, 498, 510, 318/512, 523, 558

[56] References Cited
U.S. PATENT DOCUMENTS 3,611,091  10/1971  Genovese ............................ 318/248

Primary Examiner—Robert K. Schaefer
Assistant Examiner—Eugene S. Indyk
Attorney, Agent, or Firm—Hill, Gross, Simpson, Van Santen, Steadman, Chiara & Simpson

[57] ABSTRACT

An electric motor system has a plurality of axially aligned stators and a corresponding plurality of axially aligned rotors, carried on the same shaft and angularly disposed relative one another, and a commutating device for causing an overlap in the energization of a pair of stator windings of one stator with a pair of stator windings of another stator, the overlapping energization being cyclic. The motor is powered from a source of energy and, in conjunction with a plurality of diodes and a resistance, circuits are established for producing a return current to the source as the magnetic fields of the stator cyclically operate.

8 Claims, 3 Drawing Figures

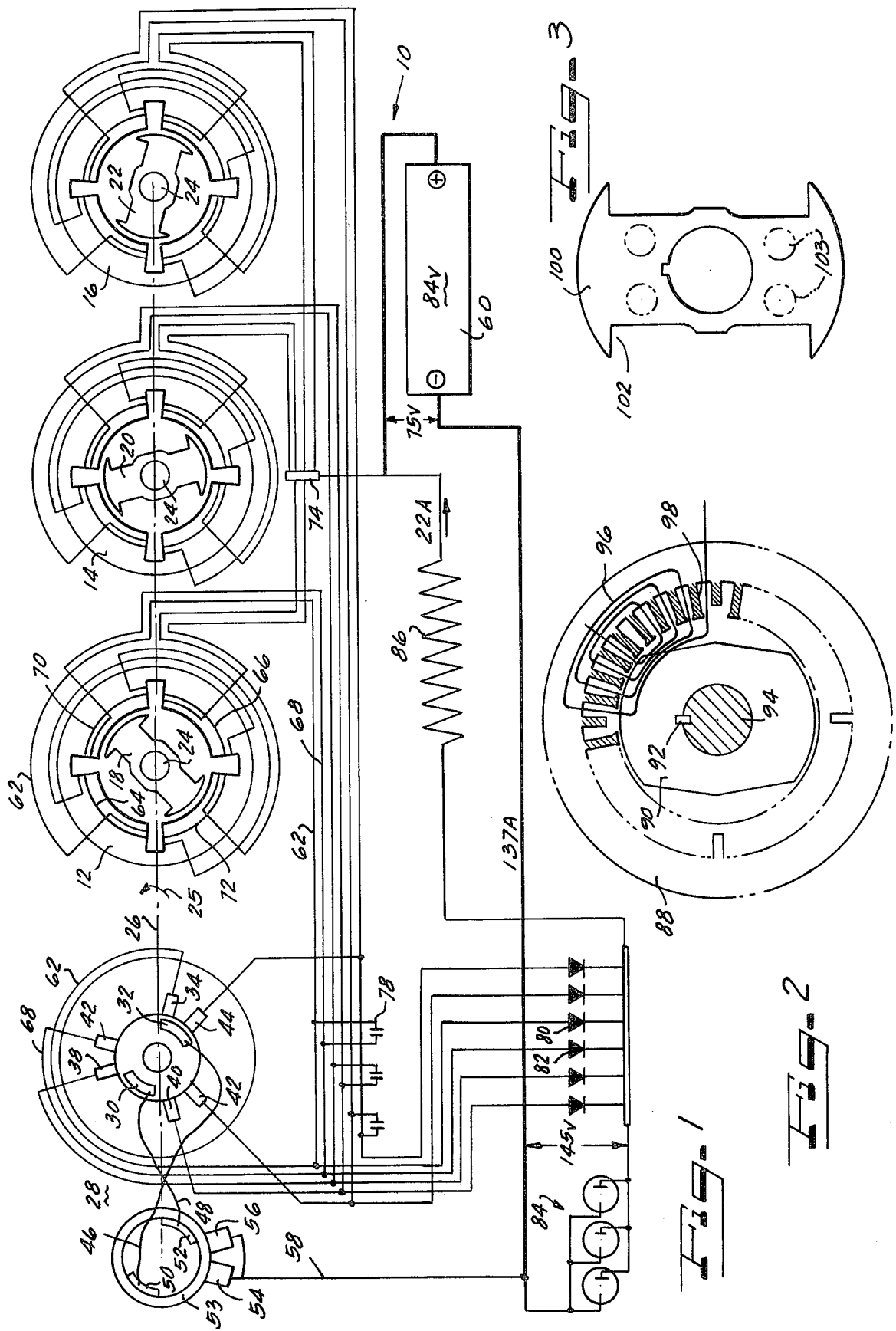

CURRENT RECYCLING ELECTRIC MOTOR SYSTEM

BACKGROUND OF THE INVENTION

1. Field of the Invention

This invention relates to electric motor systems, and is more particularly concerned with increasing the efficiency of electric motors, particularly d.c. motors, so that energy consumption occurs only during periods of driving and energy is returned to the power source during intervals between periods of driving.

2. Description of the Prior Art

As set forth in my United States Letters Patent No. 3,611,091, granted Oct. 5, 1971, the utilization of battery charging apparatus in conjunction with the operation of a direct current motor is well known in the art. It was pointed out in that patent that battery charging, via capacitors and the like, have heretofore been relatively inefficient from a total system standpoint in that battery charging is only incidental, and not of major concern, to the overall operation of the system.

In my aforementioned patent, I provided a plurality of sources and commutation apparatus for interchanging connections during operation whereby a single source at a time was utilized during a driving interval, while another source or sources were receiving a charging current which was created during the field collapse during non-driving intervals in an amount of from one-third to one-half of the current consumed.

SUMMARY OF THE INVENTION

The primary object of the present invention is to provide a highly efficient electric motor system which utilizes a power source and a minimum of switching for establishing current driving and return paths between the source and the windings of the motor.

According to the invention, which is applicable to a.c. and d.c. sources and which is also applicable to two-pole, four-pole, etc structures, a plurality of stators are provided in an axially aligned relation. Each of the stators has mounted therein a laminated and isolated rotor on a common shaft with the like rotors of the other stators, the rotors being angularly disposed with respect to one another such that at least one rotor is entering the magnetic field of a pair of poles at one stator while another rotor is still within and leaving the magnetic field of the corresponding pair of poles. Each rotor is keyed at 120° from the other rotors, each rotor is 30° out of phase with the others and each rotor is 90° active in a four-pole motor.

This unique energization technique is provided from a source by way of a commutator device having a number of pairs, equal to the number of stators, of brushes which are angularly disposed between brush pairs and with respect to the individual brushes of a pair such that electrically connected commutator segments, also angularly disposed with respect to one another, provide connection to the power source at the correct times.

As disclosed more specifically hereinbelow with respect to a four-pole system, the windings of each pair of poles of a stator have a non-electrolytic capacitor connected therebetween for the purpose of spark suppression without any loss of energy. Smaller motors, for example 12 V, 10 A will not require the use of spark suppression capacitors. Also, each winding is connected by way of a diode to the power source and to a bank of electrolytic smoothing capacitors or a battery. The diode-return path-power source arrangement provides circuits for returning and recycling current during non-driving intervals of the windings so that energy, which would ordinarily be unused and wasted, is saved.

BRIEF DESCRIPTION OF THE DRAWINGS

Other objects, features and advantages of the invention, its organization, construction and operation will be best understood from the following detailed description taken in conjunction with the accompanying drawings, on which:

FIG. 1 is a schematic representation of en electric motor system constructed in accordance with the present invention;

FIG. 2 is an end view of a single stator section illustrating a laminated rotor mounted therein, and schematically illustrating the provision of a rotor winding at one pole position; and FIG. 3 is a plan view of a rotor of slightly different configuration and including holes therein for decreasing the weight of the rotor.

DESCRIPTION OF THE PREFERRED EMBODIMENTS

Referring first to FIG. 1, a four-pole motor system is generally illustrated at 10 as comprising a plurality of stators 12, 14, 16 and a corresponding plurality of rotors 18, 20, 22 which are mounted on a common shaft 24 which is rotatable in the direction of the arrow 25 about an axis 26.

A commutator 28 is also mounted for mutual rotation with the shaft 24 about the axis 26. The general structure of the commutator 28 is, as is well known in the art, a series of commutator segments arranged in arcuate form and insulated from one another. The commutator of the present invention electrically connects a number of such segments at positions, in this particular example, 180° apart as indicated at 30 and 32. Otherwise, the overall commutator structure is well known in the motor art.

A plurality of brushes, arranged in spaced pairs 34, 36; 38, 40; 42, 44 are arranged to slide upon and bear against the commutator segments. In a particular design, the brushes of a pair are spaced 90° apart and the spacing between brush pairs is 30°. The arc covered by each of the electrically connected segments 30 and 32 is 59° (constituted by thirteen segments), and each brush has a width in the circumferential direction of approximately 15°. I have determined that the above angular dimensions hold true for each operation of the motor. Advantageously, the brushes are mounted on a common plate for mutual rotational positioning so that adjusting brush position may be used to determine the direction of rotation of the motor and to adjust the point at which the winding circuits open and adjusting the speed in a range of 100–200 rpm.

Each of the connected segments 30 and 32 are connected by way of respective conductors 46 and 48 to a pair of contacts 50 and 52 which are contacted via a ring 53, by a pair of brushes 54 and 56. The brushes 54 and 56 are commonly connected by way of a power conductor 58 to the power source, here to the negative terminal of a battery 60 to carry the total current of all commutator brushes. One side of the power source is therefore connected in sequence to the brushes 34–44, which are in turn connected to respective stator windings.

Inasmuch as each stator is identical with the next, with the exception of the position of the rotor therein, only the connections of the windings of one stator will be set forth in detail. Beginning with the brush 34, a conductor 62 extends the connection to the stator winding 64. The winding 64 is connected in series with the oppositely disposed stator winding 66 which is connected to a terminal 74, which, in turn, is connected to the positive pole of the battery 60. The brush 36 is connected to the stator winding 70 by way of a conductor 68. The stator winding 70, as illustrated on the drawing, is serially connected to the terminal 74 by way of the oppositely positioned stator winding 72. As can be seen from the commutator, and with the direction of rotation assumed at the arrow 25, that the windings 64 and 66 are first energized, via the segments 32 and the brush 34, and then the windings 70 and 72 are energized via the segments 32 and the brush 36. It is also apparent from the illustration of the commutator that the segments 30 and the brush 38 are just ending energization of one pair of pole windings of the center stator and reaching energization of the other pair of windings as the commutator rotates the segments 30 into engagement with the brush 40. It is also apparent from the illustration of the commutator that one pair of windings of the right-hand illustrated stator are energized, via the brush 44, and that, as this pair of windings becomes deenergized, the opposite pair of windings become energized by way of the brush 42. From the angular dimensions given above, with a brush extending over 15° of arc, and the brushes of a pair being separated, center-to-center, by approximately 90°, and with a connected segment arc 30 of approximately 60°, there is approximately 15° of rotation during which a winding is not energized. With the phasing provided by this angularly staggered relationship, and the angular position of the rotors, a continuous driving energization of the multiple structure is provided, while at the same time the individual collapsing fields are provided with return current paths as set forth in detail hereinbelow.

It is readily apparent from the drawing that each of the serially connected pairs of stator windings which define a pair of stator poles is serially connected to a diode, e.g. the diodes 80 and 82. The diodes are connected, on the one hand, by way of a bank of capacitors 84 (or a battery) to the power conductor 58 and the brushes 54 and 56, and on the other hand, by way of a resistor 86 to the opposite pole of the power supply. The diodes therefore, because of their polarity, connect each of the windings to the source while isolating the windings one from the other and isolating the positive of the source from the negative. Current can therefore flow from the windings and back to the positive side of the power supply and capacitor bank for recirculation via the commutator 28. Because of the high voltage generated in a winding upon disconnect thereof by the commutator, e.g. twice the supply voltage, and as this voltage is measured in series with the power supply current is returned, via the resistance 86, for recycling.

An example of stator and rotor construction is illustrated in FIG. 2, It should be understood that the stator and the rotor are laminated structures cut from 24 gauge material such as silicon steel. FIG. 3 illustrates, generally in end elevation, a stator 88 having a plurality of inwardly extending stator teeth 98 for receiving a stator winding 96. The winding 96 has been illustrated schematically in generally opposite direction to the plane of winding, the winding extending first about the center stator teeth of a pole, then about the next pair of teeth, then the next, and so forth. Each turn in FIG. 2 represents 15 turns in a working model. A shaft 94 is rotatably mounted centrally within the stator 88 and is secured, for example by keying 92, to a rotor 90, again a solid, but laminated, structure. The rotor 90 is shaped so as to have opposite arcuate portions of a dimension which is compatible with the pole overlap arrangement (angular displacement) illustrated in FIG. 1.

Inasmuch as it is primarily the portions of the rotor adjacent the arcuate surface of which are effected by the magnetic fields of the stator, the rotor for a given size machine must be constructed smaller and of lighter weight than that illustrated in FIG. 2. FIG. 3, for example, illustrates a rotor 100 which has been cut in from its periphery at 102 to reduce the weight thereof. Further weight reduction can be provided by way of holes 103.

In one test of a motor constructed in accordance with the invention, in which the motor shaft was connected to an alternator rated at 115 V, 3 Kw at 3600 rpm, and using serially connected Exide golf cart batteries, type EV-106, for a 60 V, 50 A input, the 10 batteries, rated at 75 ampere discharge for 106 minutes at 80° F, down to 5.25 V, the following data was taken over a period of 3½ hours.

|  | Start | ½ hr. | 1 hr. | 1¼ hr. | 1¾ hr. | 2 hr. | 2½ hr. | 3 hr. | 3½ hr. |
|---|---|---|---|---|---|---|---|---|---|
| Motor (rpm) | 1550 | 1600 | 1600 | 1600 | 1550 | 1600 | 1600 | 1500 | 1450 |
| Alt. (rpm) | 2700 | 2750 | 2700 | 2700 | 2600 | 2700 | 2700 | 2600 | 2500 |
| Input I | 50 | 54 | 54 | 54 | 51 | 50 | 57.5 | 56 | 54.5 |
| V | 58 | NT | 57 | NT | NT | NT | 54 | 53.5 | 52 |
| W | 2900 | NT | 3078 | NT | NT | NT | 3154 | 2996 | 2834 |
| Return I | 12 | 13 | 13 | 12.5 | 12 | 12 | 11 | 10.5 | 10 |
| V | 119 | 120 | 122 | NT | 113 | 113 | NT | NT | 100 |
| W | 1428 | 1560 | 1586 | NT | 1356 | 1356 | NT | NT | 1100 |
| Output V | 100 | 100 | 100 | 98 | 95 | 95 | 95 | 92 | 90 |
| Specific Gravity [Balls Up (U) or Down (D)] | 4U | 4U | 1,½D | 2D | 2D | 2D | 3D | 3D | 4D |

NT = Not Recorded or Not Precision Reading

With the same construction, and using a 84 V source for the battery 60, 400 V-40 A diodes, three electrolytic capacitors of 20000mfd each, 200 V and spark suppressor capacitors of 100 mfd rated at 370 V, the motor return current in another test was 22 A at a voltage between the power lead 58 and the cathodes of the diodes of 145 V. The output of the alternator was 150 VAC, 29 A at 4200 rpm at a motor speed of 2400 rpm. The time to obtain the rated discharge of the batteries was about 2 hours, a gravity of 15 or 73.5 V.

The motor system described above may be operated to advantage from a 3φ supply. In such a construction the four pole windings of each stator are connected in series. One terminal is connected to the 3φ neutral terminal and the other terminal is connected to a respective phase of the supply. Inasmuch as the commutator in the d.c. operation is essentially a phasing device, the same is omitted for 3φ operation. Also, the diodes are not used and are disconnected.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An electric motor system comprising:
   a plurality of axially aligned stators, each of said stators including at least one pair of spaced windings defining at least one pair of poles;
   a motor shaft extending through said stators and mounted for rotation on the motor axis;
   a plurality of rotors, each of said rotors disposed within a respective stator and mounted on said motor shaft angularly disposed with respect to the other rotors;
   a source of current, said source having first and second poles, said first pole connected to one end of each of said windings;
   commutator means sequentially connecting said second pole of said source of current to the other ends of each of said windings;
   a plurality of diodes, each of said diodes connecting the other end of a respective winding to and poled toward said first pole of said source of current; and
   capacitance means connecting the junction of said diodes and said first pole of said source of current and the junction of said commutator means and said second pole of said source of current.

2. The electric motor system of claim 1, comprising:
   resistance means connected in series between said one pole of said source of current and said plurality of diodes.

3. The electric motor system of claim 1, wherein said capacitance means comprises a plurality of parallel-connected electrolytic capacitors.

4. The electric motor system of claim 1, comprising:
   spark-suppression means connected across each pair of said windings.

5. The electric motor system of claim 4, wherein said spark-suppression means comprises capacitance means.

6. An electric motor system comprising:
   three axially aligned stators, each of said stators including four pole-defining windings, serially-connected in pairs with each winding of a pair of disposed diametrically of the other and each pair having first and second ends;
   a rotatably mounted motor shaft extending through and along the axis of said stators;
   three rotors mounted on said shaft within respective stators and angularly disposed with respect to each other such that a first rotor is under a pole area while a second is leaving the pole area and the third is entering the pole area;
   a source of current having first and second terminals, said first terminal connected to each of said first ends of said windings;
   commutator means sequentially connecting said second terminal to said second ends of said windings, said commutator means including a pair of brushes for each stator with each brush connected to a respective pair of said windings;
   six diodes connected in common to and poled toward said first terminal of said source and individually connected to said second ends of said windings; and
   capacitance means connecting the common connection of said diodes and said first terminal of said source to said commutator means and said second terminal of said source.

7. An electric motor system comprising:
   a plurality of axially aligned stators, each of said stators including at least one pair of spaced windings defining at least one pair of poles;
   a motor shaft extending through said stators and mounted for rotation on the motor axis;
   a plurality of rotors, each of said rotors disposed within a respective stator and mounted on said motor shaft angularly disposed with respect to the other rotors;
   a source of current, said source having first and second poles, said first pole connected to one end of each of said windings;
   commutator means sequentially connecting said second pole of said source of current to the other ends of each of said windings;
   a resistance; and
   a plurality of diodes poled toward and, each of said diodes connecting the other end of a respective winding to said first pole of said source of current via said resistance.

8. An electric motor system according to claim 7 comprising:
   battery means connecting the junction of said diodes and said first pole of said source of current and the junction of said commutator means and said second pole of said source of current.

* * * * *